June 20, 1933.  A. D. EITZEN  1,914,560
SUPPORT FOR REFLECTING MEMBERS
Filed April 10, 1929   3 Sheets-Sheet 1
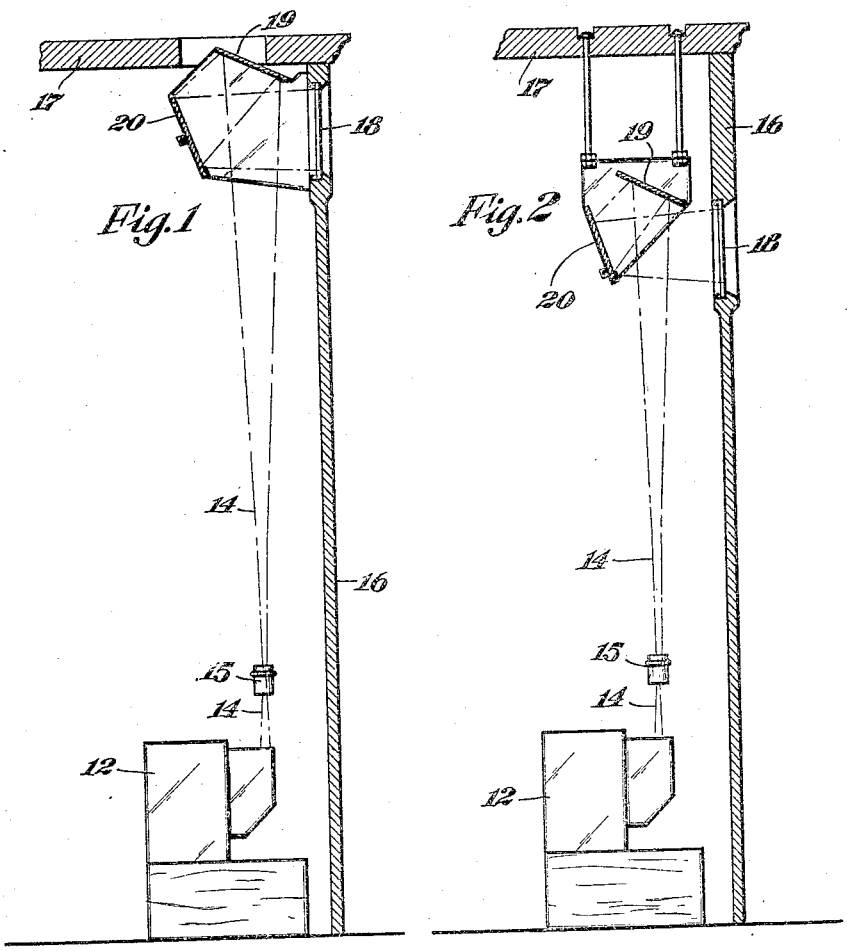
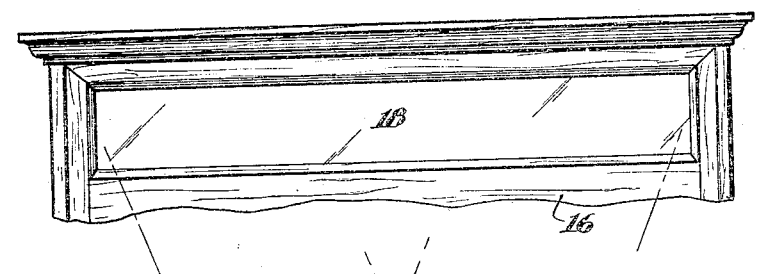
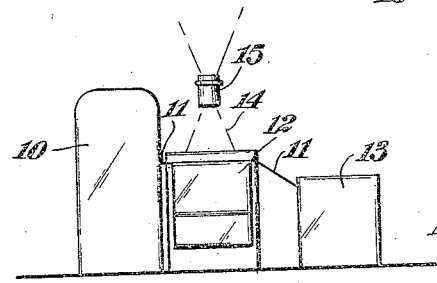
INVENTOR
August D. Eitzen,
BY Gustav Drews
ATTORNEY June 20, 1933.    A. D. EITZEN    1,914,560
SUPPORT FOR REFLECTING MEMBERS
Filed April 10, 1929    3 Sheets-Sheet 2

INVENTOR
August D. Eitzen,
BY Gustav Drews
ATTORNEY

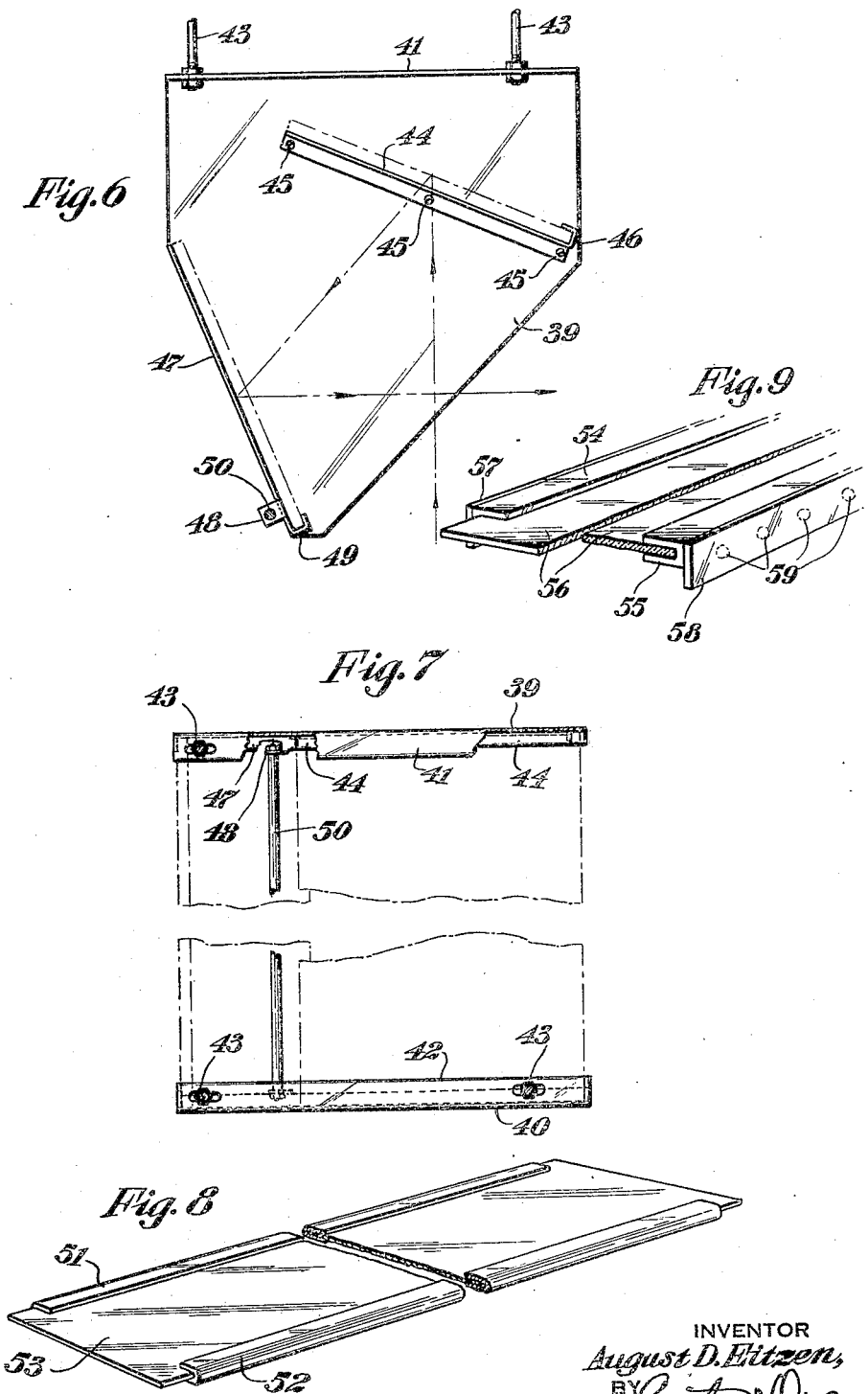

Patented June 20, 1933

1,914,560

UNITED STATES PATENT OFFICE

AUGUST D. EITZEN, OF NEW YORK, N. Y., ASSIGNOR TO NEWS PROJECTION CORPORATION, OF NEW YORK, N. Y., A CORPORATION OF NEW YORK

SUPPORT FOR REFLECTING MEMBERS

Application filed April 10, 1929. Serial No. 354,033.

My present invention relates generally to stock ticker projecting machines, and has particular reference to the support of the reflecting members thereof.

Although I have herein illustrated and shall hereinafter describe my invention applied to a projecting device of the foregoing character, nevertheless it will be understood that certain phases of my invention have a far wider applicability relating broadly to the support of mirrors in general, and more particularly, to the support of cooperably arranged reflecting surfaces.

A general object of my invention is to provide a construction which will simplify the manufacture and greatly facilitate the installation of stock ticker projecting machines, particularly in so far as the proper assembly and mounting of certain mirrors is concerned.

The features of my present invention will best be appreciated when it is pointed out that a stock ticker projecting machine generally comprises the combination with a stock ticker adapted to discharge marked tape and a winding mechanism for rewinding such tape, of a projecting device adjacent to the ticker through which the marked tape is adapted to be passed and from which a bundle of light rays is projected upwardly in a substantially vertical direction. Arranged at a relatively high point is a display screen, usually on a substantially vertical wall of a housing, and optical means, including certain reflecting surfaces, are arranged within the housing for receiving the upwardly projected rays and directing them by reflection in a substantially perpendicular direction onto the rear of said screen.

Where the reflecting members adjacent to the screen are composed of a pair of plane angularly disposed mirrors, and where such mirrors are independently installed and supported, difficulty is encountered in properly mounting the mirrors not only with respect to each other but also with respect to the initially projected rays and to the screen upon which the rays are to be directed, for the slightest maladjustment will impair the smooth cooperation of all the factors involved and will result in failure to direct the light rays in the proper desired ultimate direction.

One of the more specific objects of my present invention is to provide a mounting means or structure for the set of reflecting members or mirrors adjacent to the screen, whereby the actual mounting and installation of the mirrors is facilitated to a maximum degree, and whereby the likelihood of maladjustment or difficulties of a similar nature is practically eliminated.

From a broader aspect, it is an object of my invention to provide simple and efficient supporting means for one or more mirrors, regardless of the particular purpose for which the mirrors are to be employed.

A particular feature of my invention resides in providing a pair of symmetrical supporting sheets of rigid material, said sheets being capable of association with a housing of the foregoing character in a substantially parallel spaced relationship; and in providing supports, in the form of flanges or the like, fixedly secured to the opposed sheets in predetermined angular relationship, said supporting means being adapted to receive the proper mirrors in a predetermined proper manner for carrying out the contemplated objects.

For the attainment of the foregoing objects and such other objects as may hereinafter appear or be pointed out, I have illustrated several forms of my invention in the accompanying drawings wherein—

Figure 1 is an elevational view, partly in section, of a projecting device and a portion of a housing, illustrating one embodiment of my invention;

Figure 2 is a view similar to Figure 1, illustrating another embodiment;

Figure 3 is a front view, with parts omitted, showing the general nature of the apparatus with which my invention may be associated;

Figure 6 is a view similar to Figure 4 illustrating on an enlarged scale the embodiment of Figure 2;

Figure 7 is a view similar to Figure 5 showing the embodiment of Figure 6;

Figure 8 is a perspective view of a mirror embodying certain features of my invention; and Figure 9 is a view similar to Figure 8, showing a modification.

Figure 4:
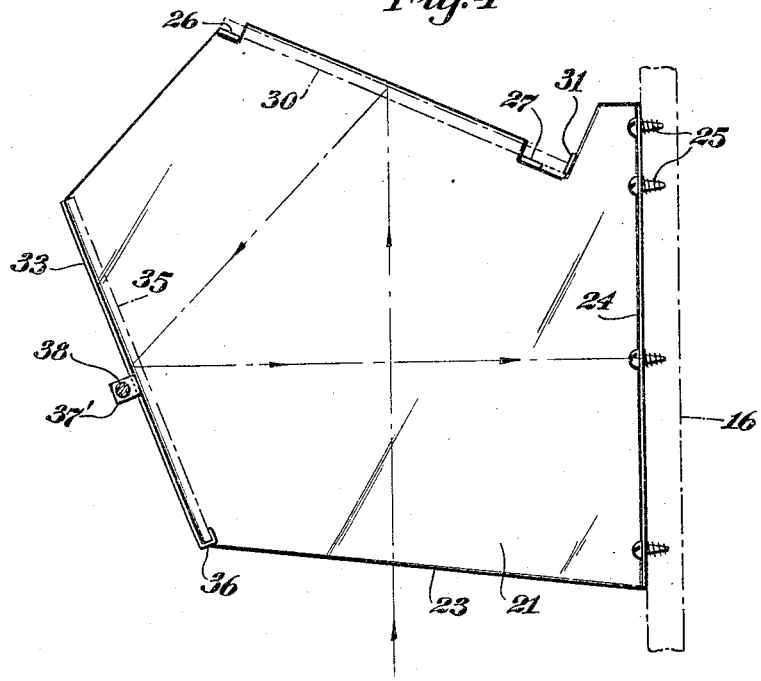
Figure 4 is an enlarged view taken in the same direction as Figure 1, of one of the mirror-supporting sheets.

Referring to Figures 1—3, I will point out that for the purpose of explaining the nature of my invention I have illustrated a stock ticker projecting machine which includes a ticker 10 adapted to discharge a marked tape 11. The latter is passed through a projecting device 12 and is thence directed toward a rewinding or take-up mechanism 13. Within the device 12 is a source of light adapted to project a beam or bundle of rays 14 upwardly through the tape 11, the rays being preferably directed through a suitable objective lens 15.

The projecting machine is preferably associated with the housing which may include the vertical front wall 16 and the top wall 17. For purposes of illustration, I have shown a display screen 18 mounted near the top of the front wall 16. The rays 14, projecting in a direction substantially parallel to the wall 16, are directed onto a mirror 19 which serves to reflect them downwardly and rearwardly onto the second mirror 20, the latter in turn re-reflecting the rays in a substantially perpendicular direction onto the rear of the screen 18.

My present invention has particular reference to the manner of mounting the mirrors 19 and 20 for the purpose outlined, and for accomplishing this object in a manner whereby the initial direction of the rays, the position of the screen, and the desired manner of accurately projecting the rays onto the screen, are factors which are fully appreciated and taken into account.

Figure 5:
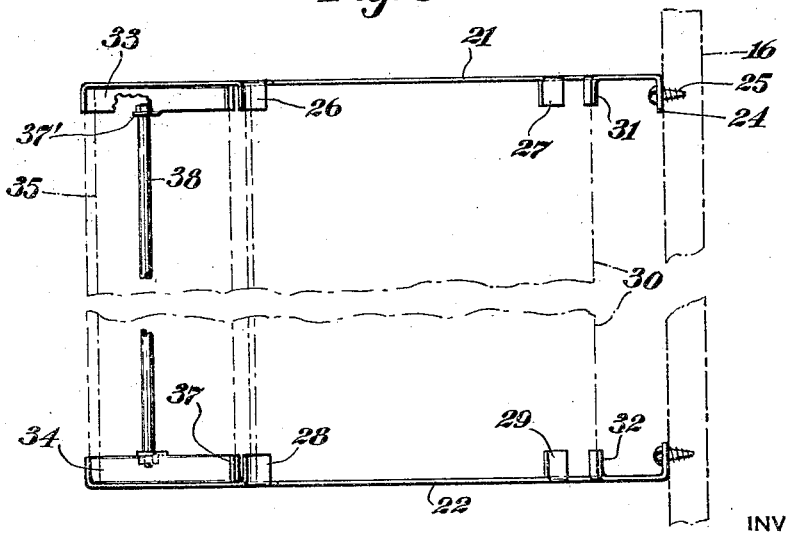
Figure 5 is a plan view of Figure 4 showing the sheet of Figure 4 in association with its complementary opposed sheet.

In Figures 4 and 5, I have illustrated one embodiment of my invention. A pair of symmetrical opposed sheets 21 and 22 of rigid material, such as suitable metal, are provided with means for mounting them to the housing, and in this embodiment, to the front wall 16. A description of one of these sheets will suffice for both, because the sheets, though not identical, are symmetrical.

The particular shape of the sheet 21 is not a salient feature of my invention, although the configuration illustrated in Figure 4 is preferable from the standpoint of simplicity and low cost of manufacture. The sheet 21 is provided with a bottom edge 23 and a front edge which is bent to provide an attachment flange 24, the latter being attachable as by screws 25 or the like, to the rear surface of the wall 16 so that the sheet 21 as a whole projects rearwardly from the wall 16 in a plane substantially perpendicular to the latter.

The upper edge of the sheet 21 is provided with a two-part flange formed by bending or shaping integral tabs or portions 26 and 27 perpendicularly with respect to the sheet 21 and toward the opposed sheet 22. The flange constituted of the portions 26 and 27 is oblique to the horizontal and cooperates with a corresponding flange formed by the portions 28 and 29 upon the sheet 22 to support a substantially rectangular plane mirror 30 at opposite marginal edges of the latter. For the purpose of facilitating this support, an abutment 31 is provided upon the sheet 21 at the lower extremity of the flange, i. e., adjacent to the flange portion 27. The abutment 31 is integrally formed with the sheet 21, extends toward the opposite sheet 22, and is arranged in a plane perpendicular to both the sheet 21 and the flange constituted of the portions 26 and 27. The abutment 31 engages the lower edge of the mirror 30 and cooperates with a corresponding abutment 32 on the sheet 22.

A second flange of similar character is provided on the sheet 21 at the edge remotest from the attaching flange 24. This flange, 33, is similarly formed upon the sheet 21 at right angles to the latter and projecting toward the opposite sheet 22. It cooperates with a similar supporting flange 34 provided on the sheet 22 for supporting the opposite marginal edges of a substantially rectangular plane mirror 35. At its lower extremity the flange 33 is provided with an abutment 36 similar to the abutment 31, the abutment 36 cooperating with a corresponding abutment 37 on the sheet 22 for engaging the lower edge of the mirror 35.

At a midportion, the flange 33 is provided with the ear 37' which is bent rearwardly to permit the attachment of one end of a tie member 38 extending between the sheets 21 and 22. The member 38 serves to retain the sheets 21 and 22 in parallelism and prevents separation of the latter. The member 38 is arranged behind the mirror 35 so that it does not in the least interfere with the functioning of the latter.

By means of the arrows in Figure 4 I have shown the manner in which the light rays 14 are directed first upon the mirror 30, thence toward the mirror 35, for re-reflection by the latter in a forward direction onto the rear of the screen 18. It will be obvious that proper and fixed arrangement of the flanges of the sheet 21 in predetermined angular relationship will result in proper positioning of the mirrors to cause a predetermined cooperation of the latter in the reflection and re-reflection of rays. This mutual cooperation cannot be altered by the installer, nor need any adjustments be made by him. As long as the sheets 21 and 22 are securely mounted to the housing and as long as the mirrors 30 and 35 are laid upon their respective supporting flanges, the desired result will be effected.

In Figures 6 and 7 I have shown a similar construction wherein the sheets 39 and 40 are provided with attaching flanges 41 and 42 arranged in a substantially horizontal plane. In this embodiment, the attachment is made to the top wall 17 of the housing instead of to the front wall 16 thereof, preferably by tie members 43 or the like. The sheet 39 is provided with a flange 44 corresponding to the portions 26—27 in Figure 4. In this embodiment, I have shown this flange as a separate element bolted or similarly secured to the sheet 39 as by means of the members 45. The flange 44 is provided at its lower extremity with the integral abutment 46 functioning like the abutment 31.

The sheet 39 is also provided with the lower supporting flange 47 corresponding to the flange 33 of Figure 4, this flange being similarly provided with a rearwardly deflected ear 48 and an abutment 49 at its lower extremity. A tie member 50 extends through the ears 48 to secure the sheets 39 and 40 together at an edge remote from the attaching flanges 41 and 42.

To minimize any sag which might occur in either of the mirrors by virtue of their marginal support, I prefer to provide U-shaped reinforcements of the character illustrated at 51 and 52 in Figure 8, and at 54 and 55 in Figure 9. The mirrors 53 and 56 of these two figures may each typify any of the mirrors heretofore referred to, and it is to be noted that a U-shaped reinforcement of substantially rigid material ensheathes each of the unsupported edges of the mirror. In Figure 9 each U-shaped reinforcement 54 and 55 is provided with an external plate 57 and 58 respectively arranged in planes perpendicular to that of the mirror 56. The plates 57 and 58 are preferably spot welded as at 59 to the respective U-shaped reinforcements, and serve to give added support and rigidity to mirrors of great size.

The reinforcements above referred to are not coextensive in length with their respective mirrors because the extreme ends of the lower edge of each mirror are preferably caused to abut or engage with the abutments hereinbefore referred to at 31, 32, 36, 37, 46, and 49.

It is to be noted that when the flange portions 26, 27, 28, and 29 directly engage the mirror 30 to support the same, and when the flanges 33 and 34 directly engage the mirror 35 to support the latter, a predetermined angular relationship between these two mirrors is precisely obtained with great facility, and any likelihood of error due to imperfections in the frames is overcome. Such errors have heretofore been generally present whenever commercially rolled channel or angle sections have been used as the portions of a four-sided mirror frame. Furthermore, with long mirrors heretofore in use, it has been customary to frame the entire periphery thereof for purposes of reinforcement. By means of the present construction, wherein only the longitudinal edges of each mirror are reinforced as at 51, 52, 54, and 55, a direct engagement is obtained between the faces of the mirrors and the supporting flanges, and accordingly, care need be exercised only in locating the portions 26, 27, 28, and 29, and the flanges 33 and 34. With these flange portions and flanges in proper relationship, the mirrors themselves will be accurately supported in the proper contemplated manner.

To avoid any distortion due to irregularities in the reinforcements 51, 52, 54 and 55, the latter are preferably cemented to the mirrors 53 and 56 respectively.

It will thus be seen that I have provided a mirror-supporting construction which is extremely simple in nature yet highly efficient, particularly in connection with the proper supporting and mounting of two cooperable mirrors which must be in predetermined angular relationship for fulfilling the contemplated function. In Figures 4 and 5 I have shown a preferred manner of constructing the supporting sheets, and it is to be noted that the entire construction is of an integral unitary character, rendering the cost of manufacture extremely small. The disposition of the attaching flanges, and the disposition of the mirror-supporting flanges at the proper acute angles and proper different inclinations to the horizontal, is a matter which can be carried into effect most efficiently in the shop. When the device is to be installed, no further adjustment or experimentation is necessary.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In combination with a vertically extending wall which includes a display screen at the upper end thereof, of a source of light rays, at the lower end of said wall means for directing light rays from said source in a direction substantially parallel to said wall, and a set of mirrors adjacent to said screen and angularly arranged to receive said light rays and direct them in a substantially perpendicular direction onto said screen; a supporting device for said mirrors comprising a pair of symmetrical opposed sheets of rigid material provided with flanges for securing the same to said wall in substantially parallel planes perpendicular to said wall, each of said sheets being provided with a pair of supporting flanges perpendicular thereto and projecting toward the opposite sheet, and each of said supporting flanges being adapted to support a marginal portion of one of said mirrors, the corresponding flange on the opposite sheet supporting an opposite marginal portion thereof.

2. In combination with an upright wall which includes a display screen at the upper end thereof, of a source of light rays, means for directing light rays from said source at the lower end of said wall in a direction substantially parallel to said wall, and a set of mirrors adjacent to said screen and angularly arranged to receive said light rays and direct them in a substantially perpendicular direction onto said screen; a supporting device for said mirrors comprising a pair of symmetrical opposed sheets of rigid material provided with flanges for securing the same to said wall in substantially parallel planes perpendicular to said wall, each of said sheets being provided with a pair of supporting flanges perpendicular thereto and projecting toward the opposite sheet, and each of said supporting flanges being adapted to support a marginal portion of one of said mirrors, the corresponding flange on the opposite sheet supporting an opposite marginal portion thereof; the flanges on each sheet being fixedly secured thereto in predetermined angular relationship corresponding to that required by the mirrors to be supported thereby.

3. In combination with an upright wall which includes a display screen at the upper end thereof, of a source of light rays, means for directing light rays from said source at the lower end of said wall in a direction substantially parallel to said wall, and a set of mirrors adjacent to said screen and angularly arranged to receive said light rays and direct them in a substantially perpendicular direction onto said screen; a supporting device for said mirrors comprising a pair of symmetrical opposed sheets of rigid material provided with flanges for securing the same to said wall in substantially parallel planes perpendicular to said wall, each of said sheets being provided with a pair of supporting flanges perpendicular thereto and projecting toward the opposite sheet, and each of said supporting flanges being adapted to support a marginal portion of one of said mirrors, the corresponding flange on the opposite sheet supporting an opposite marginal portion thereof; the flanges on each sheet being integrally formed thereon in predetermined fixed angular relationship corresponding to that required by the mirrors to be supported thereby.

4. In combination with an upright wall which includes a display screen at the upper end thereof, of a source of light rays, means for directing light rays from said source at the lower end of said wall in a direction substantially parallel to said wall, and a set of mirrors adjacent to said screen and angularly arranged to receive said light rays and direct them in a substantially perpendicular direction onto said screen; a supporting device for said mirrors comprising a pair of symmetrical opposed sheets of rigid material provided with flanges for securing the same to said wall in substantially parallel planes perpendicular to said wall, each of said sheets being provided with a pair of supporting flanges perpendicular thereto and projecting toward the opposite sheet, and each of said supporting flanges being adapted to support a marginal portion of one of said mirrors, the corresponding flange on the opposite sheet supporting an opposite marginal portion thereof; said flanges being arranged in planes oblique to the horizontal, and each thereof including an abutment at its lower extremity for engaging an edge of the mirror supported thereby.

5. In combination with an upright wall which includes a display screen at the upper end thereof, of a source of light rays means for directing light rays from said source, at the lower end of said wall in a direction substantially parallel to said wall, and a set of mirrors adjacent to said screen and angularly arranged to receive said light rays and direct them in a sustantially perpendicular direction onto said screen; a supporting device for said mirrors comprising a pair of symmetrical opposed sheets of rigid material provided with flanges for securing the same to said wall in substantially parallel planes perpendicular to said wall, each of said sheets being provided with a pair of supporting flanges perpendicular thereto and projecting toward the opposite sheet, and each of said supporting flanges being adapted to support a marginal portion of one of said mirrors, the corresponding flange on the opposite sheet supporting an opposite marginal portion thereof; said supporting flanges being arranged in planes oblique to the horizontal, and each thereof including an abutment at its lower extremity for engaging an edge of the mirror supported thereby; said abutment being integrally formed with the material of said sheet and lying in a plane perpendicular to both the sheet and the flange.

6. In combination with an upright wall which includes a display screen at the upper end thereof, of a source of light rays, means for directing light rays from said source at the lower end of said wall in a direction substantially parallel to said wall, and a set of mirrors adjacent to said screen and angularly arranged to receive said light rays and direct them in a substantially perpendicular direction onto said screen; a supporting device for said mirrors comprising a pair of symmetrical opposed sheets of rigid material provided with flanges for securing the same to said wall in substantially parallel planes perpendicular to said wall, each of said sheets being provided with a pair of supporting flanges perpendicular thereto and projecting toward the opposite sheet, and each of said supporting flanges being adapted to support a marginal portion of one of said mirrors, the corresponding flange on the opposite sheet supporting an opposite marginal portion thereof; said supporting flanges being arranged one above the other in planes forming an acute angle, whereby the mirror supported by one thereof will reflect rays for re-reflection toward the mirror supported by the other thereof, and whereby the direction of said re-reflection will bear a constant and predetermined relationship to the initial direction of said rays.

7. A mirror support comprising a housing, a pair of symmetrical opposed one-piece sheets of rigid material provided with means for securing them in substantially parallel spaced relationship to said housing, each sheet having a flange perpendicular thereto and projecting toward the other sheet, whereby a mirror may be supported at opposite marginal portions thereof by said flanges, and an abutment integral with said sheet and arranged at an extremity of said flange for engaging an edge of said supported mirror.

8. In combination, a mirror support comprising a pair of symmetrical opposed one-piece sheets of rigid material arranged in substantially parallel spaced relationship, a flange on each sheet perpendicular thereto and projecting toward the other sheet, a mirror supported at opposite marginal portions thereof on said flanges, and a U-shaped reinforcement engaging one of the unsupported mirror edges to prevent sagging of the mirror.

9. In combination, a mirror support comprising a pair of symmetrical opposed one-piece sheets of rigid material arranged in substantially parallel spaced relationship, a flange on each sheet perpendicular thereto and projecting toward the other sheet, said flanges being in a plane oblique to the horizontal, a substantially rectangular plane mirror supported at opposite edges thereof upon said flanges, an abutment at the lower extremity of each flange for engaging the lower edge of said mirror, and a U-shaped reinforcement ensheathing each of the two unsupported mirror edges to prevent the latter from sagging between said sheets.

10. A mirror support comprising a pair of symmetrical opposed one-piece sheets of rigid material provided with means for securing them in substantially parallel spaced relationship to one another, each sheet having a flange perpendicular thereto and projecting toward the other sheet, whereby a mirror may be supported at opposite marginal portions thereof by said flanges, and an abutment integral with said sheet and arranged at an extremity of said flange for engaging an edge of said supported mirror.

11. A mirror support comprising a housing, a pair of symmetrical opposed one-piece sheets of rigid material provided with means for securing them in substantially parallel spaced relationship to said housing, said means comprising an attaching flange at an edge portion of each sheet, and a tie member extending between said sheets behind the supported mirror and joining the sheet edges remote from said attaching flanges, each sheet having a second flange perpendicular to the sheet and projecting toward the other sheet, whereby a mirror may be supported at opposite marginal portions thereof by said flanges.

12. A mirror support for projection systems of the type in which a set of mirrors is used to deflect upon a wall-supported screen a beam of light projected in substantial parallelism with said wall by a projector situated near said wall and spaced from said screen; said mirror support comprising a pair of end sheets provided with means by which they may be secured to a wall in a position opposite said screen and in spaced apart relation to each other, said end-sheets having portions adapted to engage and support a plurality of mirrors interposed between said end-sheets, and means to connect said end-sheets with each other in assembled position abutting the respective ends of said mirrors, said end-sheets and mirrors constituting when thus assembled a unitary structure having an opening adapted to pass said beam, projected by said projector alongside of said wall, to one of said mirrors, and having its side adjacent to said wall open to pass toward the wall-supported screen a portion of the beam deflected by the component mirrors.

13. A mirror support for projection systems of the type in which a set of mirrors is used to deflect upon a wall-supported screen a beam of light projected in substantial parallelism with said wall by a projector situated near said wall and spaced from said screen; said mirror support comprising a pair of end-sheets provided with means by which they may be secured to a wall in a position opposite said screen and in spaced apart relation to each other, said end-sheets having portions adapted to engage and support a plurality of mirrors interposed between said end-sheets, and means to connect said end-sheets with each other in assembled position abutting the respective ends of said mirrors, said end-sheets and mirrors constituting when thus assembled a unitary structure having an opening adapted to pass said beam, projected by said projector alongside of said wall, to one of said mirrors, and having its side adjacent to said wall open to pass toward the wall-supported screen a portion of the beam deflected by said first mentioned mirror to another of said mirrors and thence directed screen-ward at right angles to the axis of the original beam.

14. A mirror support characterized by having as elements end-members and mirrors assembled as set forth in claim 12, and further characterized by having a plurality of hangers adapted to be secured to an overhead wall.

15. A mirror support for projection systems of the type in which a set of mirrors is used to deflect upon a wall-supported screen a beam of light projected in substantial parallelism with said wall by a projector situated near said wall and spaced from said screen; said mirror support comprising a pair of end-sheets provided with means by which they may be secured to said wall in a position opposite and adjacent to said screen and in spaced apart relation to each other, said end-sheets having portions adapted to engage and support a plurality of mirrors interposed between said end-sheets, and means to connect said end-sheets with each other in assembled position abutting the respective ends of said mirrors, said end-sheets and mirrors constituting when thus assembled a unitary structure having an opening adapted to pass said beam, projected by said projector alongside of said wall, to one of said mirrors, and having its side adjacent to said wall open to pass toward the wall-supported screen a portion of the beam deflected by the component mirrors.

16. A mirror support for projection systems of the type in which a set of mirrors is used to deflect upon a wall-supported screen a beam of light projected in substantial parallelism with said wall by a projector situated near said wall and spaced from said screen; said mirror support comprising a pair of symmetrical opposed end-sheets of rigid material provided with means including flanges by which they may be secured to said wall adjacent to said screen and in spaced apart relation to each other, said end-sheets having other flanged portions adapted to receive and support a plurality of mirrors interposed between said end-sheets, and means, including a tension rod, to connect said end-sheets with each other in assembled position abutting the respective ends of said mirrors, and holding said mirrors under compression, said end-sheets and mirrors constituting when thus assembled a unitary structure having an opening adapted to pass said beam, projected by said projector alongside of said wall, to one of said mirrors, and having its side adjacent to said wall open to pass toward the wall-supported screen a portion of the beam deflected by the component mirrors.

AUGUST D. EITZEN.